United States Patent Office 3,563,694
Patented Feb. 16, 1971

3,563,694
DEPILATORY COMPOSITION AND PROCESS FOR MAKING
Abraham Minton, Rego Park, N.Y., assignor to Marie Ganee Ltd., New York, N.Y., a corporation of Delaware
No Drawing. Filed Dec. 7, 1967, Ser. No. 688,658
Int. Cl. A61k 7/00, 7/14
U.S. Cl. 8—160                                   2 Claims

ABSTRACT OF THE DISCLOSURE

A depilatory cream is provided which is used at room temperature by spreading the same over the surface from which the hair is to be removed, pressing a cloth into the layer, and then stripping the cloth away. The depilatory composition is comprised of a water soluble or emulsifiable solvent which is fluid at room temperature and which comprises at least one of the following materials: (1) a polyol which is tribasic or higher, i.e. a polyhydric alcohol having at least three replaceable hydrogen atoms, (2) a derivative of such a tribasic or higher polyol or (3) a polymer of up to 10 monomeric units of such a tribasic or higher polyol. There is dissolved in the solvent an effective amount of a solute comprising a water-soluble or emulsifiable carbohydrate which is soluble in the solvent when hot and which substantially remains in solution when cold. The cream can be prepared by dissolving the solute in the hot solvent and maintaining the solution hot until the viscosity of the solution is established at a desired level. This can be controlled by the water content of the solution. A preferred example of the depilatory cream is a composition comprising glycerol having about 40–50% by weight of a cold water-soluble dextrin dissolved therein and containing about 4½–5% by weight of water.

---

The present invention relates to a depilatory composition and process for its preparation, more particularly the present invention relates to a creamy depilatory solution which can be applied at room temperature and having easily spreadable consistency and good shelf life characteristics.

Known depilatory compositions can function by way of a variety of mechanisms, including chemical and physico-chemical operation. The latter category includes the adhesive-type depilatories in which an adherence of the depilatory to the hair is relied on for its removal. Some depilatory compositions in this category are applied hot and are allowed to cool thereby to entrap the hair within or otherwise bond it to the cooled, solidified composition for removal by mechanical separation from the skin. The so-called "cold" depilatory compositions which also work by adhesion to hair, are applied at ambient temperature. A usual drawback of the cold depilatories is that they tend to adhere both to the skin and to the hair to be removed, resulting in some removal of the upper surfaces of the skin with attendant discomfort, pain, and irritation of the remaining skin. Another principal drawback of the prior art cold depilatory compositions is their relatively poor shelf life during storage, manifested by a gradual increase of viscosity, and relatively rapid formation of a highly viscous skin on the surface, and the like. Consequently, there is a loss of spreadability and increased difficulty of application.

In accordance with the present invention, a creamy depilatory solution is provided, having a viscosity at 25° C. of between $5 \times 10^5$ and $2 \times 10^6$ BD units and comprising (a) a water-soluble or emulsifiable solvent which is fluid at room temperature and which is selected from the group consisting of (i) a polyol containing at least three replaceable hydrogen atoms, (ii) a derivative of such a polyol, (iii) a polymer, each molecule of which is constituted of up to 10 monomeric units of such a polyol, and (iv) mixtures thereof; and (b) at least one water-soluble or emulsifiable carbohydrate as the ingredient of the solute phase dissolved in said solvent phase and being soluble in said solvent when hot and remaining substantially dissolved therein at ambient temperature.

The depilatory solution can be prepared by dissolving at an elevated temperature the ingredient of the solute phase in the solvent phase, and maintaining the solution at an elevated temperature until its water content is reduced to a concentration at which the 25° C. viscosity of the solution is between at least $5 \times 10^5$ BD units, suitably not higher than $2 \times 10^6$ BD units, preferably between $7.5 \times 10^5$ and $1.25 \times 10^6$ units.

As used throughout the specification and the claims, viscosity expressed in BD units can be obtained with a viscometer, Model RVF, made by Brookfield Engineering Laboratories and equipped with a Helipath device. A T-bar (size TF) is immersed by an exactly 60 second descent to a depth of about ⅞ inch, and a rate of rotation of 4 r.p.m. is employed. The BD values are determined by multiplying by 25,000 the reading obtained from the device thus giving values in centipoises. Unless stated otherwise, all voscosity values given herein are at 25° C. Viscosity should be measured preferably after the passing of some time, such as after overnight standing, in an incubator at 25° C. after the substantially homogenous solution has been formed, to establish an equilibrium in the rheological character of the depilatory composition.

The solute phase increases the viscosity of the solvent phase, and contributes selective adhesion to the depilatory solution. The term "selective adhesion," as applied to the unique characteristics of the depilatory compositions of the present invention, denotes the tendency of these compositions to adhere well to the hair intended to be removed, while having a remarkably lesser tendency to adhere to the skin. This feature of selective adhesion results in most convenient, painless and easy removal of the hair from the skin from which it has grown. It has been found that in employing the depilatory compositions of the present invention the favorable selective adhesion characteristics are manifested only when the viscosity of the depilatory is at least $5 \times 10^5$ BD units. Below this threshold viscosity the hair tends to break off at the skin rather than being pulled out from the follicle.

The desired selective adhesion characteristics are most prevalent when a water-soluble carbohydrate, more suitably an at least partially hydrolyzed starch, especially a dextrin, is employed as the ingredient of the solute phase. Water-soluble corn or tapioca dextrin, particularly the cold water-soluble species, have been found very suitable for use as the ingredient of the solute phase. Sugars such as glucose or sucrose can also be employed, however these should be used in greater concentration than starches hydrolyzed to a lesser degree.

The water-soluble or emulsifiable solvents useful in accordance with the present invention are fluid at room temperature and comprise at least one of: (1) a polyol which is tribasic or higher, i.e. a polyhydric alcohol having at least three replaceable hydrogen atoms, (2) a derivative of such a tribasic or higher polyol or (3) a polymer of up to 10 monomeric units of such a tribasic or higher polyol. These solvents manifest desirable humectant tendencies when used in the compositions of the present invention.

Examples of suitable ingredients for the solvent phase include glycerol, polyglycerols up to decaglycerol, and mixtures thereof: polyol derivatives such as monopropoxylated sorbitol, and the like. While some of these solvents are known generally as humectants in some types of cosmetic preparations, it has been found that in depilatory compositions of the type involved herein, humectant action, i.e. improvement of shelf life stability by prevention of loss of moisture on standing and prevention of the presumably colloidal phenomenon of the setting up of partially hydrolyzed carbohydrate solutes, can be obtained only when the carbohydrate is dissolved in, rather than merely being blended with, the particular solvent phase.

The present invention is based on the discovery that most cold water-soluble solute materials, useful for the purposes of the present invention, are not soluble in most solvents useful for the present invention, when the solvent is at room temperature. However, the solutes are soluble in the solvents when hot, and remain in solution at room temperature, with attendant high shelf life characteristics. Formation of solution requires that the solvent be heated to a sufficiently high temperature at which it is capable of dissolving the solute. Generally, the higher the molecular weight of the solute ingredient, the solution temperature has to be correspondingly also higher. While the temperature has to be sufficiently high to bring about solution, it should not be so high at which the water content of the resulting mass would become unduly low. The period of exposure to the elevated temperature would depend on the actual temperature and the ingredients, and should be long enough to permit completion of solution and blending of the mass into a homogenous product. For example, when 44–48% by weight, based on the composition, of a light yellow, cold water-soluble tapioca dextrin is used as the ingredient of the solute phase, and glycerine as the solvent phase, the latter has to be heated to at least 80° C., preferably at least 110° C. to accomplish solution, and the maximum temperature is 130° C. to permit retention of about 4–6% by weight, based on the composition, of water, more preferably 4.5–5%. The resulting composition will have a viscosity within the preferred range.

The concentrations of the ingredients depend on the combination of the particular ingredients employed and its tendencies to fulfill the viscosity requirements of the depilatory. Generally, the more viscous and/or the more tacky the solvent, the less solute is needed. For example, less solute is required in the case of using a polyglycerol solvent than if a monoglycerol is used. Similarly, lesser amounts of the solute ingredient are required when the solute is a starch hydrolyzed to a lesser degree than one which has been hydrolyzed to a greater degree. For example, when the solvent is glycerol, only about 38–42% by weight, based on the depilatory, of a hot water-soluble corn dextrin is required to obtain the desired viscosity, but 44–48% by weight of a cold water-soluble tapioca dextrin has to be used to obtain comparable results. The effective concentration of a given solute in a given solvent to establish the desired viscosity, can easily be determined by routine experimentation.

If desired, the composition can also contain pigments or dyes to impart appealing coloration, perfumes, or other cosmetic agents for various purposes.

The depilatory composition of the present invention can be used by spreading onto the skin surface from which the hair is to be removed, such as with a spatula, a thin layer of the creamy solution. For best results the layer should be sufficiently thinly applied so that individual hair is still perceivable through the cream. A piece of dry cloth, such as of closely woven cotton that is substantially devoid of fuzz, is then pressed over the coated area, the skin is stretched taut around the cloth which is then removed with a firm motion. Any excess of the depilatory which may be left on the skin, can be easily removed by rinsing with water.

In the following illustrative examples, all parts and percentages are by weight, unless otherwise indicated.

EXAMPLE 1

A slurry is prepared of 60% $TiO_2$, 39.8% glycerol of 99+% purity and 0.2% FD & C Yellow No. 5 (Tartriazine, trisodium salt of 3-carboxy-5-hydroxy-1-p-sulfophenyl-4-p-sulfophenylazopyrazole) by mixing in a high-speed blender. 3 g. of this slurry is mixed with 47.5 g. of 99+% grade glycerol and 1.5 g. water, and the mixture is then heated to about 80° C. 48 g. light yellow tapioca dextrin sold by A. E. Staley Mfg. Co. under the trade designation Leghorn 102 is added to the heated solvent mixture. The resulting mass is thoroughly blended while the temperature is raised to 115° C. and held there until a uniform creamy consistency is obtained. A sample from the hot kettle is weighed and its water content is determined by Karl Fischer titrimetric water determination technique as described in the 17th Edition of the U.S. Pharmacopoea, p. 924. The temperature is maintained at about 115° C. and the mixture is intermittently agitated until the water content is at about 4.6%. The mass is then allowed to cool. The 25° C. viscosity of the resulting creamy solution is at about $10^6$ BD units. Tests conducted with the depilatory composition result in most satisfactory removal of hair. No formation of high viscosity surface film can be observed even after prolonged exposure of the composition in an uncovered jar.

EXAMPLE 2

A mixture of 3 g. of the pigmented slurry of Example 1, and 73 g. of a monopropoxylated sorbitol (85%) sold by Atlas Chemical Products Corp. Under the trade designation Atlas G–2401, is heated to about 60° C. After this temperature is reached 24 g. of the same tapioca dextrin as used in Example 1 is added, and the resulting mixture is heated to about 110° C. until homogenous in appearance and the water content remaining in the batch is about 4.5–5%. The viscosity at 25° C. is $10^6$ BD units.

EXAMPLE 3

A mixture of 3 g. of the pigmented slurry of Example 1, and 69 g. of a polyglycerol sold by Witco Chemical Co. under the trade designation PG, and being a mixture of mostly di- and triglycerols, and 3 g. water, is heated to about 75° C. After this temperature is reached 25 g. of the same tapioca dextrin as used in Example 1 is added, and the resulting mixture is heated to about 110° C. until homogenous in appearance and the water content remaining in the batch is about 4.5–5%. The viscosity at 25° C. is $10^6$ BD units.

EXAMPLE 4

A mixture of 3 g. of the pigmented slurry of Example 1, and 53 g. of 99+% glycerol and 2 g. of water is heated to 70° C. After this temperature is reached 42 g. of a corn dextrin (hot water soluble) is added, and the resulting mixture is heated to about 110° C. until homogenous in appearance and the water content remaining in the batch is about 4.5%. The viscosity at 25° C. is $7.5 \times 10^5$ BD units.

EXAMPLE 5

A mixture of 3 g. of the pigmented slurry of Example 1, and 45 g. of 99+% glycerol and 2 g. water is heated to about 50° C. After this temperature is reached 50 g. of sucrose (fine powder) is added, and the resulting mixture is heated to about 110° C. until homogenous in appearance and the water content remaining in the batch is about 4.5–5%. The viscosity at 25° C. is $10^6$ BD units.

EXAMPLE 6

A mixture of 3 g. of the pigmented slurry of Example 1, and 42 g. of 99+% glycerol and 2 g. water is heated to about 50° C. After this temperature is reached 53 g. of dextrose powder is added, and the resulting mixture is heated to about 110° C. until homogenous in appearance and the water content remaining in the batch is about 4.5–5%. The viscosity at 25° C. is $10^6$ BD units.

I claim:

1. A depilatory cream having a viscosity at a temperature of 25° C. of at least $5 \times 10^5$ centipoises and prepared by a process comprising the steps of (a) dissolving a water-soluble carbohydrate selected from the group consisting of (I) a dextrin, (II) glucose, (III) sucrose, and (IV) mixtures thereof, in a solvent which is fluid at room temperature and which is selected from the group consisting of (I) glycerol, (II) monopropoxysorbitol, (III) a glycerol polymer each molecule of which is constituted of from 2 to 10 monomeric units, and (IV) mixtures thereof, at a temperature of from about 80° C. to about 130° C. which is sufficient to dissolve said carbohydrate and to form a solution of said carbohydrate in said solvent, and (b) bringing the resulting solution to room temperature.

2. A process for preparing a depilatory cream comprising the steps of (a) dissolving a water-soluble carbohydrate selected from the group consisting of (I) a dextrin, (II) glucose, (III) sucrose, and IV) mixtures thereof, in a solvent which is fluid at room temperature and which is selected from the group consisting of (I) glycerol, (II) monopropoxysorbitol, (III) a glycerol polymer each molecule of which is constituted of from 2 to 10 monomeric units, and (IV) mixtures thereof, at a temperature of from about 80° C. to about 130° C. which is sufficient to dissolve said carbohydrate and to form a solution of said carbohydrate in said solvent, and (b) bringing the resulting solution to room temperature.

References Cited

UNITED STATES PATENTS 2,417,882    3/1947    Neary _____ 167—89

OTHER REFERENCES

Skeist, Handbook of Adhesives, Sept. 18, 1962, pp. 439–446.

Thomssen, Modern Cosmetics, 1947, p. 393.

ALBERT T. MEYERS, Primary Examiner

A. J. ROBINSON, Assistant Examiner

U.S. Cl. X.R.

106—162, 213